(12) United States Patent
Tsubaki et al.

(10) Patent No.: US 12,112,900 B2
(45) Date of Patent: Oct. 8, 2024

(54) ELECTROLYTIC CAPACITOR

(71) Applicant: Panasonic Intellectual Property Management Co., Ltd., Osaka (JP)

(72) Inventors: Yuichiro Tsubaki, Kyoto (JP); Kazuhiro Takatani, Hyogo (JP); Mitsuhisa Yoshimura, Osaka (JP); Miyoko Masuda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 17/811,265

(22) Filed: Jul. 7, 2022

(65) Prior Publication Data

US 2022/0344105 A1 Oct. 27, 2022

Related U.S. Application Data

(63) Continuation of application No. PCT/JP2021/003300, filed on Jan. 29, 2021.

(30) Foreign Application Priority Data

Jan. 30, 2020 (JP) .................................. 2020-014233

(51) Int. Cl.
*H01G 9/15* (2006.01)
*H01G 9/052* (2006.01)
*H01G 9/10* (2006.01)

(52) U.S. Cl.
CPC ............... *H01G 9/15* (2013.01); *H01G 9/052* (2013.01); *H01G 9/10* (2013.01)

(58) Field of Classification Search
CPC ............ H01G 9/15; H01G 9/052; H01G 9/10; H01G 9/028; H01G 9/035; H01G 9/055; H01G 9/145
See application file for complete search history.

(56) References Cited

U.S. PATENT DOCUMENTS 9,384,901 B2 * 7/2016 Weaver ................. H01G 9/042
9,824,829 B1 * 11/2017 Muffoletto ............... H01G 9/10
(Continued)

FOREIGN PATENT DOCUMENTS

CN 108885942 A 11/2018
JP 2014-116489 6/2014
(Continued)

OTHER PUBLICATIONS

International Search Report of PCT application No. PCT/JP2021/003300 dated Mar. 23, 2021.
(Continued)

*Primary Examiner* — Dion R. Ferguson
(74) *Attorney, Agent, or Firm* — Rimon P.C.

(57) ABSTRACT

An electrolytic capacitor includes a capacitor element, a liquid component, a case housing the capacitor element and the liquid component, and a sealing member sealing the case. the capacitor element includes a porous sintered body including a dielectric layer, a cathode foil facing at least a part of the porous sintered body, and a conductive polymer covering at least a part of a surface of the dielectric layer. The conductive polymer is in contact with the cathode foil. And a void in the capacitor element is impregnated with the liquid component.

14 Claims, 4 Drawing Sheets

(56) References Cited

U.S. PATENT DOCUMENTS

| | | | | |
|---|---|---|---|---|
| 9,870,868 B1* | 1/2018 | Laforge | ............... | H01G 9/08 |
| 10,020,127 B1* | 7/2018 | Muffoletto | ............... | H01G 9/14 |
| 10,832,871 B2* | 11/2020 | Petrzilek | ............... | H01G 9/035 |
| 11,373,812 B2* | 6/2022 | Nagara | ............... | H01G 9/145 |
| 2013/0155580 A1* | 6/2013 | Karnik | ............... | H01G 9/052 |
| | | | | 29/25.03 |
| 2016/0141110 A1* | 5/2016 | Djebara | ............... | H01G 9/008 |
| | | | | 29/25.03 |
| 2018/0137989 A1* | 5/2018 | Petrzilek | ............... | H01G 9/035 |
| 2019/0013152 A1* | 1/2019 | Aoyama | ............... | H01G 9/028 |
| 2020/0365331 A1* | 11/2020 | Nagara | ............... | H01G 9/14 |
| 2022/0344105 A1* | 10/2022 | Tsubaki | ............... | H01G 9/145 |

FOREIGN PATENT DOCUMENTS

| | | | | |
|---|---|---|---|---|
| JP | 2016-100602 | | 5/2016 | |
| JP | 2016-192505 | | 11/2016 | |
| JP | 2017-183728 | | 10/2017 | |
| JP | 2019-054147 | | 4/2019 | |
| JP | 6535409 B | | 6/2019 | |
| JP | 2019-145696 | | 8/2019 | |
| JP | 2019-145726 | | 8/2019 | |
| WO | WO-2020022472 A1 * | 1/2020 | ............ | H01G 9/025 |
| WO | WO-2023190203 A1 * | 10/2023 | | |

OTHER PUBLICATIONS

English Translation of Chinese Office Action dated May 31, 2024 for the related Chinese Patent Application No. 202180011095.5.

* cited by examiner

ELECTROLYTIC CAPACITOR

BACKGROUND

1. Technical Field

The present disclosure relates to an electrolytic capacitor including a conductive polymer and a liquid component.

2. Description of the Related Art

Recently, a small-sized and high-capacitance capacitor for high frequency applications has been desired along with downsizing and lightening of electronic devices. As such a capacitor, a solid electrolytic capacitor having low equivalent series resistance (ESR) and excellent frequency characteristics has been developed. A solid electrolytic capacitor includes an anode body, a dielectric layer formed on a surface of the anode body, a solid electrolyte layer formed on a surface of the dielectric layer, and a cathode layer formed on the solid electrolyte layer. As the anode body, there can be used a porous sintered body obtained by sintering particles of a valve metal such as tantalum, niobium, and titanium (Unexamined Japanese Patent Publication No. 2019-145726).

On the other hand, a wet type electrolytic capacitor or a wet type electrolytic condenser (Unexamined Japanese Patent Publication No. 2016-100602, Unexamined Japanese Patent Publication No. 2017-183728, and Unexamined Japanese Patent Publication No. 2016-192505) using a sintered body as an anode body has been proposed. Unexamined Japanese Patent Publication No. 2016-100602 discloses that an electrochemically active cathode material is disposed in at least a part of a casing, and the electrochemically active cathode material can be a conductive polymer.

SUMMARY

An electrolytic capacitor according to one aspect of the present disclosure includes a capacitor element, a liquid component, a case housing the capacitor element and the liquid component, and a sealing member sealing the case. The capacitor element includes a porous sintered body including a dielectric layer, a cathode foil facing at least a part of the porous sintered body, and a conductive polymer covering at least a part of a surface of the dielectric layer. The conductive polymer is in contact with the cathode foil. And a void in the capacitor element is impregnated with the liquid component.

According to the electrolytic capacitor of the present disclosure, good capacitor characteristics can be achieved.

DETAILED DESCRIPTIONS OF EMBODIMENTS

Figure 1:
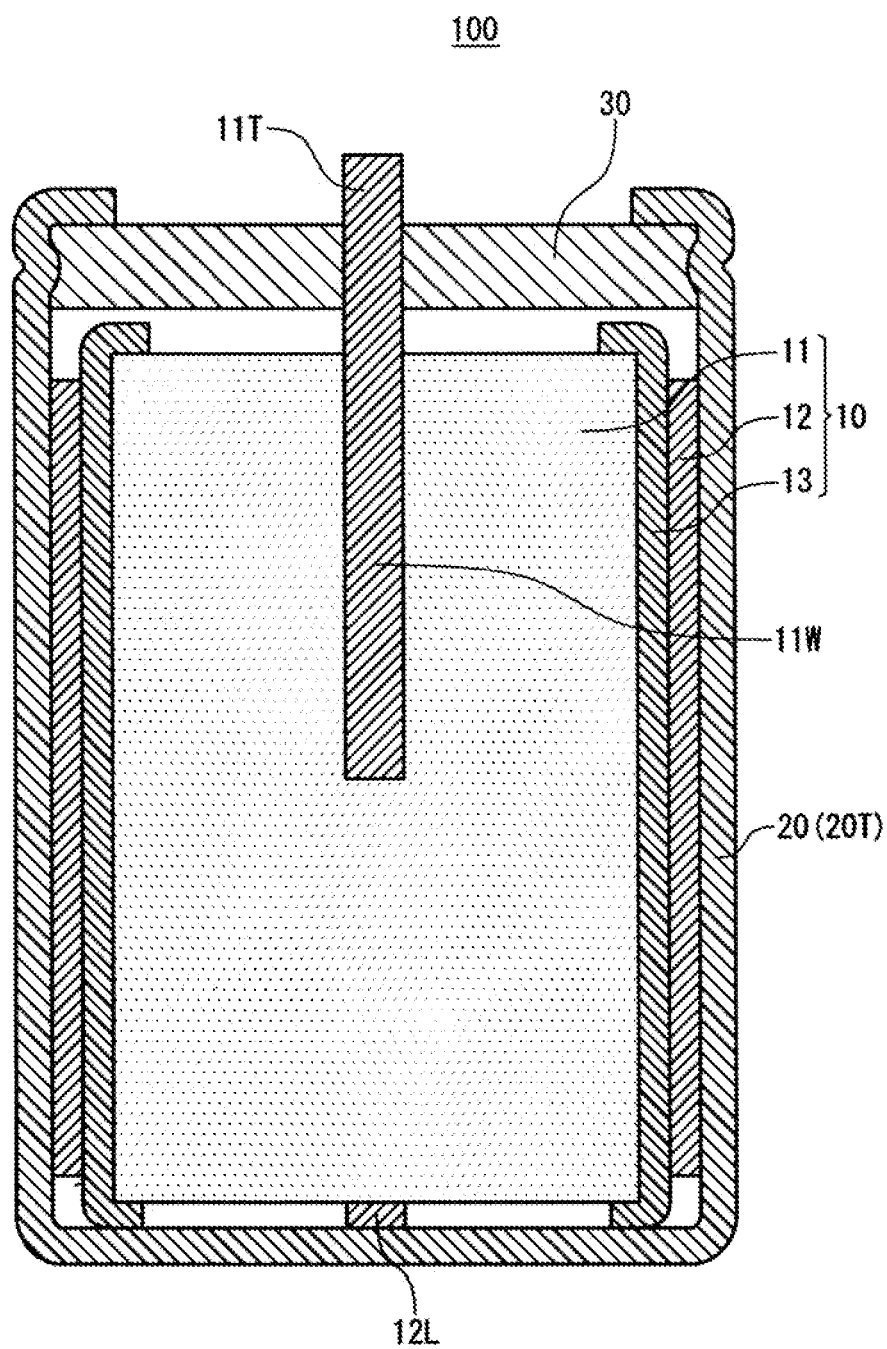
FIG. 1 is a sectional view illustrating an electrolytic capacitor according to an exemplary embodiment of the present disclosure.

From the viewpoint of reducing the leakage current of an electrolytic capacitor, it is preferable to impregnate a void of a porous sintered body with a liquid component to facilitate self-repair of a dielectric layer. However, it is difficult to achieve good capacitor characteristics with a conventional structure proposed by Unexamined Japanese Patent Publication No. 2019-145726 when a conductive polymer and a liquid component are used in combination. Unexamined Japanese Patent Publication No. 2016-100602 proposes attaching an electrochemically active cathode material to a cathode substrate. However, when such a configuration is adopted, it is difficult to obtain a low-resistance electrolytic capacitor.

An electrolytic capacitor according to the present exemplary embodiment includes a capacitor element, a liquid component, a case housing the capacitor element and the liquid component, and a sealing member sealing the case. The capacitor element includes a porous sintered body including a dielectric layer, a cathode foil disposed so as to face at least a part of the porous sintered body, and a conductive polymer that covers at least a part of a surface of the dielectric layer and is in contact with the cathode foil. A void of the capacitor element (in particular, voids of the porous sintered body) is impregnated with the liquid component.

The liquid component enhances the self-repairing ability of the dielectric layer. This reduces the leakage current. The conductive polymer contributes to reduction of the equivalent series resistance (ESR). Use of these materials in combination is a requirement for achieving capacitor characteristics improved over conventional capacitor characteristics.

In the above configuration, since the conductive polymer covers at least a part of the surface of the dielectric layer and is in contact with the cathode foil, a conductive path electrically connecting the dielectric layer and the cathode foil is formed. When such a conductive path is formed of the conductive polymer, a current can be easily drawn, and good capacitor characteristics can be achieved.

Between the dielectric layer and the cathode foil, a separator may be interposed. The conductive polymer is combined with the separator to form a strong conductive path electrically connecting the dielectric layer and the cathode foil together with the separator. As a result, a current can be more easily drawn, and better capacitor characteristics can be achieved.

The conductive polymer includes, for example, a π-conjugated conductive polymer and a first sulfonic acid. The first sulfonic acid functions as a dopant in the conductive polymer. The first sulfonic acid may be contained in the conductive polymer in the form of anions.

The dielectric layer may contain an oxide (hereinafter also referred to as oxide A) of at least one selected from the group consisting of tantalum, niobium, titanium, aluminum, silicon, and tungsten. Such a dielectric layer has high corrosion resistance and is suitable for an electrolytic capacitor containing a liquid component. Oxide A may be a main component of the dielectric layer. Here, the main component is a component that accounts for more than or equal to 50% by mass (further more than or equal to 80% by mass) of the whole. That is, more than or equal to 50% by mass of the dielectric layer may be oxide A.

It is known, as a dedoping phenomenon, that the dopant contained in the conductive polymer gradually escapes from the conductive polymer into the liquid component. As a result, the conductive polymer is deteriorated, and ESR of the electrolytic capacitor gradually increases. To suppress the dedoping phenomenon, it is effective to incorporate an acid component in the liquid component.

The liquid component may contain a second sulfonic acid. The second sulfonic acid in the liquid component has such an action as to suppress the dedoping phenomenon of the first sulfonic acid from the conductive polymer and stabilize the conductivity of the conductive polymer. Even when the first sulfonic acid is removed from the conductive polymer, a dedoped site is re-doped with the second sulfonic acid, and thus ESR is unlikely to increase.

Sulfonic acids are more stable than an acid component (such as a carboxylic acid) exhibiting weak acidity. In addition, the self-repairing ability of the dielectric layer is remarkably enhanced by a sulfonic acid. Thus, since the liquid component contains the second sulfonic acid, ESR of the electrolytic capacitor can be kept low even at a high temperature.

When the liquid component contains the second sulfonic acid, generally, the corrosion of the dielectric layer can be promoted by a strongly acidic liquid component. On the other hand, by using a material having excellent corrosion resistance such as tantalum, niobium, titanium, and tungsten for the dielectric layer, the dedoping phenomenon can be suppressed while suppressing corrosion of the dielectric layer. As a result, the effect of suppressing an increase in leakage current and ESR is further improved.

It is preferable that the first sulfonic acid contained in the conductive polymer do not significantly move inside the conductive polymer, resulting in low occurrence of the dedoping phenomenon. On the other hand, the first sulfonic acid contained in the liquid component preferably does not excessively increase the viscosity of the liquid component, easily dissociates in the liquid component, and produces an anion that easily moves in the liquid component. From the above, the molecular weight of the second sulfonic acid is preferably smaller than the molecular weight of the first sulfonic acid. In this instance, the second sulfonic acid having a molecular weight smaller than that of the first sulfonic acid easily enters the dedoped site from which the first sulfonic acid has been removed, and the re-doping smoothly proceeds.

The cathode foil may be a metal foil. The cathode foil may be a foil of an alloy containing a valve metal as a main component from the viewpoint of suppressing corrosion caused by the liquid component. Here, the main component is a component that accounts for more than or equal to 50% by mass (further more than or equal to 80% by mass) of the whole. Examples of the valve metal include tantalum, niobium, aluminum, and titanium. Examples of another element contained in the alloy containing the valve metal as a main component include silicon, vanadium, boron, and nitrogen. The alloy is formed by adding such an element to the valve metal, which is the main component.

Specifically, the cathode foil is preferably an aluminum foil (including an alloy foil containing aluminum as a main component). The aluminum foil is less expensive than other valve metals and has sufficient corrosion resistance even in a strongly acidic (such as a pH less than or equal to 4.5, less than or equal to 3.8, or less than or equal to 3.6) liquid component when used as a cathode material. Furthermore, since the aluminum foil is easily subjected to surface enlargement treatment such as etching and blasting and is softer than a tantalum foil and a titanium foil, processing such as winding is also easy. As the metal foil, a chromium alloy capable of forming a passive film on its surface, stainless steel, or the like may be used from the viewpoint of reducing the corrosiveness caused by the liquid component.

On a surface of the cathode foil, a conductive layer may be formed. The conductive layer may contain, for example, at least one selected from the group consisting of titanium, nickel, and carbon. Among them, the conductive layer containing carbon is inexpensive and excellent in conductivity. As a result, the current drawing ability through the cathode foil is improved, and the reduction in the overall combined capacitance including a capacitance at the cathode foil can be suppressed.

The liquid component may contain an alkylene glycol compound. The alkylene glycol compound has such an action as to penetrate into the conductive polymer to adjust the arrangement state of the conductive polymer. Thus, by using a polyalkylene glycol compound, the denseness of the conductive polymer covering at least a part of the surface of the dielectric layer is improved. As a result, even when most of the surface of the dielectric layer is covered with the conductive polymer, voids of the porous sintered body are less likely to be blocked by the conductive polymer, and the liquid component easily permeates into voids located deep in the sintered body. Hence, a sufficient effect of suppressing the leakage current can be expected.

Since the alkylene glycol compound easily penetrates into the conductive polymer, the alkylene glycol compound also has such an action as to enhance the self-repairing ability of the dielectric layer by the liquid component.

Examples of the alkylene glycol compound include alkylene glycols such as ethylene glycol and propylene glycol, polyethylene glycols such as diethylene glycol and triethylene glycol, and glycerins such as glycerin and polyglycerin. For example, a content proportion of the alkylene glycol compound in the liquid component may range from 10% by mass to 95% by mass, inclusive.

The capacitor element may include an anode terminal electrically connected to the porous sintered body. A part of the anode terminal may be extended to the outside of the case through the sealing member. This structure enables an external terminal of an anode to be provided without impairing the sealing property.

The capacitor element may include a cathode terminal electrically connected to the cathode foil. In this instance, a part of the cathode terminal may be extended to the outside of the case through the sealing member. This structure enables an external terminal of a cathode to be provided without impairing the sealing property. When the case is conductive, the cathode foil and the case may be electrically connected to each other, and the case itself may be used as an external terminal of the cathode.

As the sealing member, for example, an insulating member having rubber elasticity may be used. This structure makes it easy to provide external terminals of the anode and the cathode without impairing the sealing property. In addition, the insulating member having rubber elasticity is excellent in sealing property and inexpensive among sealing members.

The case may be a metal container. The metal constituting the metal container is not particularly limited, but aluminum is preferable from the viewpoint of being inexpensive and excellent in workability. Thus, the case is preferably constituted of aluminum (including an alloy containing aluminum as a main component).

The shape of the porous sintered body is not particularly limited, but it is preferable that the porous sintered body have a cylindrical shape from the viewpoint of enhancing the reliability of sealing by the sealing member. In this instance, a bottomed cylindrical case having an opening can be used as the case. As the sealing member for sealing the case, a cylindrical or disk-shaped insulating member for closing the opening of the case can be used. In this instance, since a pressure applied to the sealing member from the opening end portion of the case is made uniform, it is easy to enhance the reliability of sealing by the sealing member. When the liquid component is strongly acidic, it is important to increase the reliability of sealing.

The voids of the porous sintered body are preferably fine. On the other hand, the conductive polymer preferably covers the surface of the dielectric layer even in a deep portion (particularly near the center of the porous sintered body) inside the porous sintered body. In addition, it is preferable that the deep portion (particularly near the center) of the porous sintered body be impregnated with the liquid component.

In order to achieve a more preferable state, a mass of the liquid component contained in the electrolytic capacitor may range from 1% to 200%, inclusive, with respect to a mass of the conductive polymer.

Further, in order to achieve a more preferable state, a volume of the liquid component impregnated into the porous sintered body may range from 5% to 99.9%, inclusive, with respect to a total volume of the voids in the porous sintered body.

Hereinafter, each component will be described in more detail.

(Porous Sintered Body (Anode Body))

For example, the porous sintered body is a porous sintered body obtained by sintering particles of a corrosion-resistant metal. The corrosion-resistant metal is preferably at least one selected from the group consisting of tantalum, niobium, titanium, and tungsten. The corrosion-resistant metal may be an alloy. For example, an alloy containing the corrosion-resistant metal and other substances such as silicon, vanadium, and boron may be used. The alloy of the corrosion-resistant metal preferably contains more than or equal to 50 atom % of the corrosion-resistant metal.

(Dielectric Layer)

The dielectric layer preferably contains at least one oxide A selected from the group consisting of tantalum, niobium, titanium, aluminum, silicon, and tungsten in terms of high corrosion resistance. Oxide A may be an oxide of a corrosion-resistant alloy. Alternatively, an oxide of a compound containing a corrosion-resistant metal and a typical element such as nitrogen may be used for the dielectric layer.

For example, the dielectric layer is formed by a method of immersing the anode body in an anodizing solution to anodize the surface of the anode body or a method of heating the anode body under the atmosphere containing oxygen.

For example, a porosity of the porous sintered body may range from 45% to 75%, inclusive. The porosity refers to a proportion of voids in the porous sintered body. In a step of forming the electrolytic capacitor, the dielectric layer and the conductive polymer are formed in the porous sintered body, and the liquid component or the like is entered in the porous sintered body. Here, the porosity is defined by adding, as a void, a portion where the dielectric layer and the conductive polymer is formed, or the liquid component or the like is entered without considering substances (the dielectric layer, the conductive polymer, the liquid component, and the like) to be formed or entered in the porous sintered body.

(Conductive Polymer)

The conductive polymer includes, for example, a π-conjugated conductive polymer and a dopant (such as the first sulfonic acid). The conductive polymer may be formed by a method of applying a solution containing a raw material monomer of the π-conjugated conductive polymer and the dopant to the dielectric layer to cause chemical polymerization or electrolytic polymerization on the dielectric layer. Meanwhile, a conductive polymer synthesized in advance may be applied to the dielectric layer in the viewpoint that excellent withstand voltage characteristics can be expected. For example, a liquid of polymer dispersion containing the conductive polymer and the first sulfonic acid (particularly a polymeric sulfonic acid) may be impregnated to the dielectric layer, the conductive polymer may be attached to the dielectric layer so as to cover at least a part of the dielectric layer, and then the conductive polymer may be dried.

A concentration of the conductive polymer contained in the polymer dispersion preferably ranges from 0.5% by mass to 10% by mass, inclusive. An average particle diameter D50 of the conductive polymer preferably ranges, for example, from 0.01 μm to 0.5 μm, inclusive. Here, the average particle diameter D50 is a median diameter in a volume particle size distribution obtained by a particle size distribution measuring apparatus using dynamic light scattering.

(π-Conjugated Conductive Polymer)

The π-conjugated conductive polymer is preferably, for example, polypyrrole, polythiophene, or polyaniline. In the present description, polypyrrole, polythiophene, polyaniline, and the like mean polymers having polypyrrole, polythiophene, polyaniline, and the like as a basic skeleton, respectively. Thus, polypyrrole, polythiophene, polyaniline, and the like may include their respective derivatives. Polythiophene includes, for example, poly(3,4-ethylenedioxythiophene) (PEDOT) and the like that are derivatives of polythiophene. These may be used alone, may be used in combination of two or more types, or may be a copolymer of two or more types of monomers. A weight-average molecular weight of the conductive polymer is not particularly limited and ranges from 1,000 to 200,000, inclusive, for example.

<First Sulfonic Acid>

As the first sulfonic acid, aliphatic sulfonic acids, aromatic sulfonic acids, polymeric sulfonic acids, and the like can be used. Among them, a polymeric sulfonic acid is most preferable from the viewpoint that the re-doping of the second sulfonic acid having a low molecular weight easily proceeds and that the dedoping phenomenon hardly occurs.

Examples of the aliphatic sulfonic acid include monobasic saturated aliphatic sulfonic acids such as methanesulfonic acid, ethanesulfonic acid, propanesulfonic acid, isopropylsulfonic acid, butanesulfonic acid, isobutylsulfonic acid, t-butylsulfonic acid, pentanesulfonic acid, isopentylsulfonic acid, hexanesulfonic acid, nonanesulfonic acid, decanesulfonic acid, undecanesulfonic acid, dodecanesulfonic acid, tridecanesulfonic acid, tetradecanesulfonic acid, n-octylsulfonic acid, cetylsulfonic acid, and 10-camphorsulfonic acid; monobasic unsaturated aliphatic sulfonic acids such as ethylenesulfonic acid and 1-propene-1-sulfonic acid; and polybasic aliphatic sulfonic acids such as methionic acid, 1,1-ethanedisulfonic acid, 1,2-ethanedisulfonic acid, 1,1-propanedisulfonic acid, 1,3-propanedisulfonic acid, and polyvinylsulfonic acid, and aliphatic sulfonic acids having 1 to 30 carbon atoms are preferable.

Examples of the aromatic sulfonic acid include monobasic aromatic sulfonic acids such as benzenesulfonic acid, p-toluenesulfonic acid, o-toluenesulfonic acid, m-toluenesulfonic acid, o-xylene-4-sulfonic acid, m-xylene-4-sulfonic acid, 4-ethylbenzenesulfonic acid, 4-propylbenzenesulfonic acid, 4-butylbenzenesulfonic acid, 4-dodecylbenzenesulfonic acid, 4-octylbenzenesulfonic acid, 2-methyl-5-isopropylbenzenesulfoni c acid, 2-naphthalenesulfonic acid, butylnaphthalenesulfonic acid, t-butylnaphthalenesulfonic acid, 2,4,5-trichlorobenzenesulfonic acid, benzyl sulfonic acid, and phenylethanesulfonic acid; polybasic aromatic sulfonic acids such as m-benzenedisulfonic acid, 1,4-naphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, and sulfonated polystyrene; oxyaromatic sulfonic acids such as phenol-2-sulfonic acid, phenol-3-sulfonic acid, phenol-4-sulfonic acid, anisole-o-sulfonic acid, anisole-m-sulfonic acid, phenetol-o-sulfonic acid, phenetol-m-sulfonic acid, phenol-2,4-disulfonic acid, phenol-2,4,6-trisulfonic acid, anisole-2,4-disulfonic acid, phenetol-2,5-disulfonic acid, 2-oxytoluene-4-sulfonic acid, pyrocatechin-4-sulfonic acid, veratrole-4-sulfonic acid, resorcinol-4-sulfonic acid, 2-oxy-1-methoxybenzene-4-sulfonic acid, 1,2-dioxybenzene-3,5-disulfonic acid, resorcinol-4,6-disulfonic acid, hydroquinonesulfonic acid, hydroquinone-2,5-disulfonic acid, and 1,2,3-trioxybenzene-4-sulfonic acid; sulfoaromatic carboxylic acids such as o-sulfobenzoic acid, m-sulfobenzoic acid, p-sulfobenzoic acid, 2,4-disulfobenzoic acid, 3-sulfophthalic acid, 3,5-disulfophthalic acid, 4-sulfoisophthalic acid, 2-sulfoterephthalic acid, 2-methyl-4-sulfobenzoic acid, 2-methyl-3,5-disulfobenzoic acid, 4-propyl-3-sulfobenzoic acid, 2,4,6-trimethyl-3-sulfobenzoic acid, 2-methyl-5-sulfoterephthalic acid, 5-sulfosalicylic acid, and 3-oxy-4-sulfobenzoic acid; thioaromatic sulfonic acids such as thiophenolsulfonic acid, thioanisole-4-sulfonic acid, and thiophenetol-4-sulfonic acid; and aromatic sulfonic acids having other functional groups such as benzaldehyde-o-sulfonic acid, benzaldehyde-2,4-disulfonic acid, acetophenone-o-sulfonic acid, acetophenone-2,4-disulfonic acid, benzophenone-o-sulfonic acid, benzophenone-3,3'-disulfonic acid, 4-aminophenol-3-sulfonic acid, anthraquinone-1-sulfonic acid, anthraquinone-1,5-disulfonic acid, anthraquinone-1,8-disulfonic acid, anthraquinone-2,6-disulfonic acid, and 2-methylanthraquinone-1-sulfonic acid, and aromatic sulfonic acids having 6 to 30 carbon atoms are preferable.

Specific examples of the polymeric sulfonic acid include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid. These may be used alone or may be used in combination of two or more kinds. These may be a homopolymer or a copolymer of two or more kinds of monomers. Particularly, polystyrenesulfonic acid (PSS) is preferable. A weight average molecular weight of the polymeric sulfonic acid is not particularly limited but preferably ranges, for example, from 1,000 to 100,000, inclusive, in terms of facilitating formation of a homogeneous solid electrolyte layer.

(Liquid Component)

The liquid component may contain only a solvent or may contain a solvent and a solute. The solute preferably contains at least an acid component that dissociates or ionizes in the solvent. The liquid component may contain a base component, a salt, and the like in addition to the acid component. The acid component may include, for example, a sulfonic acid (second sulfonic acid).

<Second Sulfonic Acid>

As the second sulfonic acid, any of the sulfonic acids listed as the first sulfonic acid can be used. Among them, aliphatic sulfonic acids having 1 to 30 carbon atoms and aromatic sulfonic acids having 6 to 30 carbon atoms are preferable. Among the aliphatic sulfonic acids, monobasic saturated aliphatic sulfonic acids (such as hexanesulfonic acid and 10-camphorsulfonic acid) are preferable. Among the aromatic sulfonic acids, 5-sulfosalicylic acid, p-toluenesulfonic acid, and 2-naphthalenesulfonic acid are preferable.

The second sulfonic acid may have a third acidic group other than the sulfo group. Examples of the third acidic group include a hydroxy group and a carboxy group. When the second sulfonic acid is an aromatic sulfonic acid, the second sulfonic acid may have a phenolic hydroxy group as the third acidic group. Examples of such an aromatic sulfonic acid include oxyaromatic sulfonic acids (such as phenol-2-sulfonic acid) and sulfoaromatic carboxylic acids (such as p-sulfobenzoic acid, 3-sulfophthalic acid, and 5-sulfosalicylic acid).

From the viewpoint of an effect of suppressing dedoping of the first sulfonic acid from the conductive polymer and enhancing the self-repairing ability of the dielectric layer, it is preferable that a concentration of the second sulfonic acid in the liquid component ranges from 0.01% by mass to 50% by mass, inclusive. The concentration of the second sulfonic acid in the liquid component more preferably ranges from 5% by mass to 50% by mass, inclusive, more preferably 10% by mass to 35% by mass, inclusive, particularly preferably 10% by mass to 20% by mass, inclusive.

The molecular weight of the second sulfonic acid is preferably smaller than the molecular weight of the first sulfonic acid. The molecular weight of the second sulfonic acid ranges, for example, from 90 to 2,000, inclusive, preferably from 90 to 500, inclusive.

A pH of the liquid component is preferably less than or equal to 4.5, more preferably less than or equal to 3.8, further preferably less than or equal to 3.6. When the pH of the liquid component is less than or equal to 4.5, deterioration of the conductive polymer is further suppressed. The pH is preferably more than or equal to −2, more preferably more than or equal to −1. The pH is a value measured with a measuring device (such as LAQUA pH Meter F-71 manufactured by HORIBA, Ltd.) using a glass electrode for measuring the pH of an aqueous solution.

From the viewpoint of enhancing the effect of stabilizing ESR, the liquid component may have the third acidic group other than the sulfo group and contain a third acid component different from the second sulfonic acid. The third acid component is, for example, an acid other than sulfuric acid and sulfonic acid. Among them, the third acid component is preferably an acid component exhibiting weak acidity. Examples of the third acid component include carboxylic acids, boric acids, and phosphonic acids. Among them, carboxylic acids are preferable. The concentration of a carboxylic acid in the electrolytic solution preferably ranges from 5% by mass to 50% by mass, inclusive, more preferably from 10% by mass to 30% by mass, inclusive, from the viewpoint of easy dissociation of the carboxylic acid.

The carboxylic acid preferably contains an aromatic compound (aromatic dicarboxylic acid) having two or more carboxy groups. The carboxy groups of the aromatic dicarboxylic acid are stable and are less likely to undergo a side reaction. An effect of stabilizing the conductive polymer over a long period of time is thus exhibited. In particular, at least one selected from the group consisting of o-phthalic acid and pyromellitic acid is preferable as the aromatic dicarboxylic acid.

The liquid component may contain a base component. At least a part of the acid component is neutralized by the base component. This enables corrosion of the anode body by the acid component to be suppressed while the concentration of the acid component is increased. From a viewpoint of effectively suppressing dedoping of the first sulfonic acid from the conductive polymer, the acid component is preferably more excessive than the base component in terms of an equivalence ratio. For example, the equivalence ratio of the acid component to the base component preferably ranges from 1.0 to 30, inclusive. The concentration of the base component in the liquid component preferably ranges from 0.1% by mass to 20% by mass, inclusive, more preferably from 3% by mass to 10% by mass, inclusive.

The base component is preferably at least one selected from the group consisting of ammonia, a primary amine, a secondary amine, a tertiary amine, a quaternary ammonium compound, and an amidinium compound. Among them, at least one selected from the group consisting of a primary amine, a secondary amine, and a tertiary amine is preferable. By using primary to tertiary amines, an effect of stabilizing ESR for a long period of time is enhanced. An aliphatic amine, an aromatic amine, a heterocyclic amine, or the like can be used as each amine. Among them, an aliphatic amine having a molecular weight ranging from 72 to 102, inclusive, is preferable from the viewpoint of a high degree of dissociation.

Examples of the primary to tertiary amines include methylamine, dimethylamine, trimethylamine, ethylamine, diethylamine, triethylamine, ethylenediamine, N,N-diisopropylethylamine, tetramethylethylenediamine, hexamethylenediamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These may be used alone or may be used in combination of two or more kinds. Among them, tertiary amines are preferable, and in particular, triethylamine and monoethyldimethylamine are preferred. The quaternary ammonium compound is preferably a diethyldimethylammonium salt or the like, and the amidine compound is preferably a cyclic amidine salt such as a 1,2,3,4-tetramethylimidazolinium salt.

The solvent may contain a glycol compound, a sulfone compound, a lactone compound, a carbonate compound, a monohydric or tri-or-more-hydric alcohol, and the like. An alkylene glycol compound such as ethylene glycol (EG), propylene glycol (PG), and polyethylene glycol (PEG), diethylene glycol, or triethylene glycol can be used as the glycol compound. As the sulfone compound, sulfolane, dimethyl sulfoxide, diethyl sulfoxide, or the like can be used. As the lactone compound, γ-butyrolactone, γ-valerolactone, or the like can be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), or the like can be used. As the alcohol, for example, glycerin or polyglycerin can be used. These compounds may be used alone or in combination of a plurality of types of compound.

Among them, the solvent preferably contains at least one (hereinafter referred to as a main solvent) selected from the group consisting of γ-butyrolactone, sulfolane, and ethylene glycol. A proportion of the main solvent in the solvent is preferably more than or equal to 50% by mass, more preferably more than or equal to 60% by mass, still more preferably more than or equal to 70% by mass.

The sealing member preferably has rubber elasticity by containing a polymer component. The sealing member preferably has appropriate hardness by further containing inorganic particles. Examples of the polymer component include butyl rubber, ethylene-propylene rubber, isoprene rubber, silicone rubber, fluorine rubber, and chlorosulfonated polyethylene rubber. Examples of the inorganic particles include talc, kaolin, and silica. The proportion of the polymer component in the sealing member is, for example, less than or equal to 60% by mass, preferably more than or equal to 10% by mass, from the viewpoint of suppressing deterioration due to the liquid component. When the liquid component contains the second sulfonic acid, the proportion of the polymer component in the sealing member is preferably less than or equal to 50% by mass.

Hereinafter, the present disclosure is more specifically described with reference to exemplary embodiments. However, the following exemplary embodiments do not limit the present disclosure.

(Electrolytic Capacitor)

Figure 2:
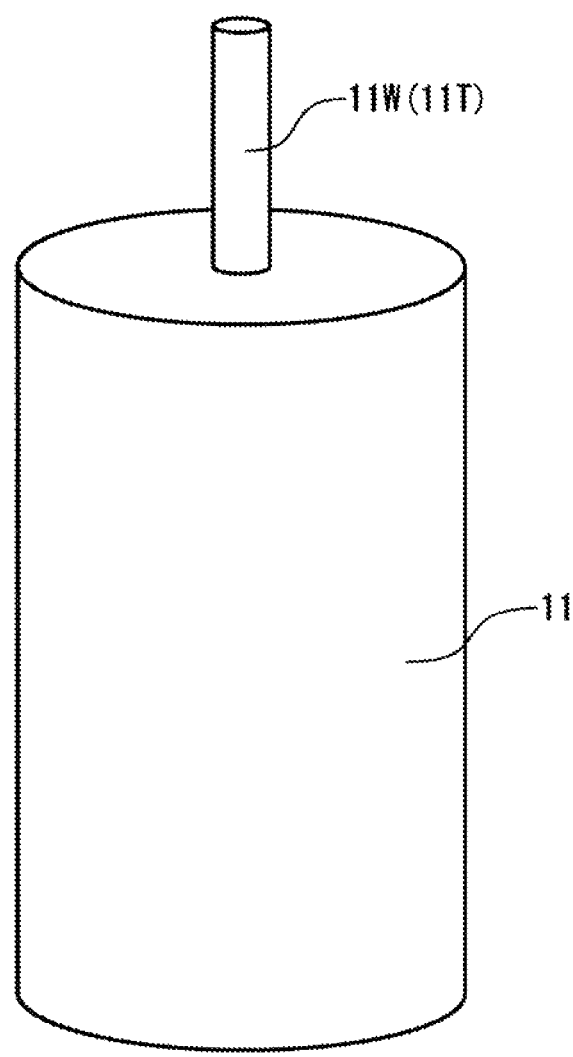
FIG. 2 is a perspective view illustrating a porous sintered body included in the electrolytic capacitor according to the exemplary embodiment.
Figure 3:
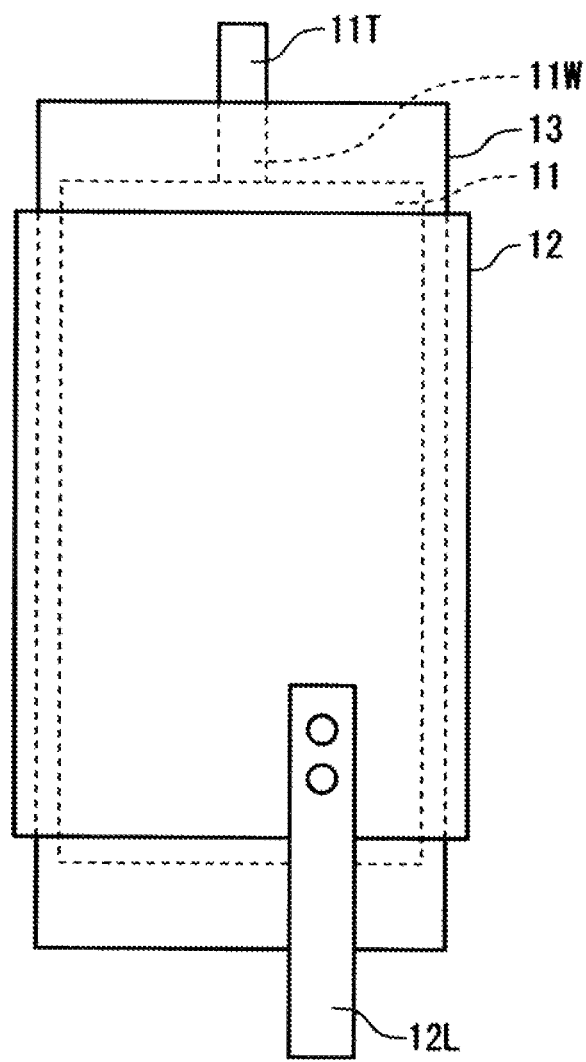
FIG. 3 is a front view illustrating a capacitor element included in the electrolytic capacitor according to the exemplary embodiment.

An electrolytic capacitor according to an exemplary embodiment of the present disclosure will be described with reference to FIGS. 1 to 4, but the electrolytic capacitor is not limiting to this configuration. FIG. 1 is a sectional view illustrating the electrolytic capacitor according to the exemplary embodiment of the present disclosure. FIG. 2 is a perspective view illustrating a porous sintered body included in the electrolytic capacitor according to the exemplary embodiment. FIG. 3 is a front view illustrating a capacitor element included in the electrolytic capacitor according to the exemplary embodiment.

Electrolytic capacitor 100 includes capacitor element 10, a liquid component (not shown), and an exterior body that houses these components. The exterior body includes bottomed cylindrical case 20 having an opening and cylindrical or disk-shaped sealing member 30 that closes the opening of case 20. Sealing member 30 is made of an insulating member having rubber elasticity. Cylindrical case 20 is, at an end near the opening, processed inward by drawing, and the end is curled to swage an outer surface of sealing member 30. Case 20 is a metal container (for example, made of aluminum) and has conductivity.

Capacitor element 10 includes cylindrical porous sintered body 11 (i.e., anode body) including a dielectric layer, cathode foil 12 disposed so as to face a peripheral surface of cylindrical porous sintered body 11, and separator 13 interposed between porous sintered body 11 and cathode foil 12. As separator 13, for example, a woven fabric, a nonwoven fabric, a microporous membrane, or the like is used. Cellulose, polyethylene terephthalate, vinylon, polyamide, or the like can be used for fibers of a woven fabric or a nonwoven fabric. As a material of the microporous membrane, for example, polyolefin is used.

One end side of anode wire 11W is embedded in porous sintered body 11. The other end side of anode wire 11W is planted from one end surface of cylindrical porous sintered body 11 to constitute anode terminal 11T. Anode terminal 11T is extended to the outside of case 20 through sealing member 30. On the other hand, one end of cathode lead 12L is connected to cathode foil 12 by welding or the like. The other end of cathode lead 12L is connected to an inner bottom surface of case 20, which is a metal container, by welding or the like. Accordingly, case 20 is also used as cathode terminal 20T.

Figure 4:
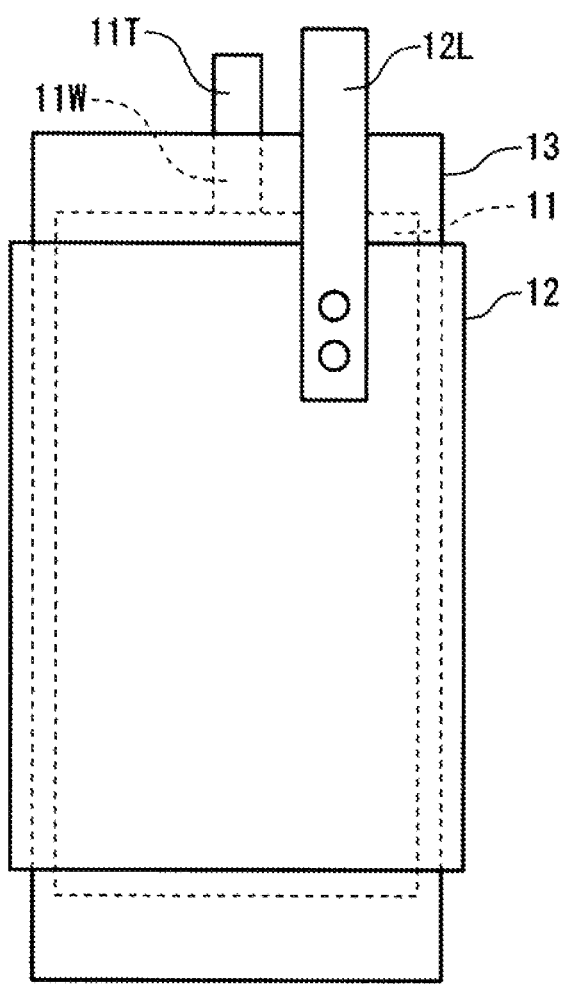
FIG. 4 is a front view illustrating a capacitor element according to another exemplary embodiment of the present disclosure.

FIG. 4 is a perspective view illustrating capacitor element 10A according to another exemplary embodiment. In capacitor element 10A, the other end of cathode lead 12L connected to cathode foil 12 is led out toward the same side as anode terminal 11T. In this instance, a wire-shaped cathode terminal (not shown) penetrating sealing member 30 may be separately provided, a part of the cathode terminal may be exposed from sealing member 30 so as to face the inside of case 20, and the other end of cathode lead 12L may be electrically connected to the exposed portion. As a result, both anode terminal 11T and the cathode terminal can be disposed on the opening side of case 20.

Although not illustrated, the conductive polymer is disposed so as to cover at least a part of the surface of the dielectric layer and to be in contact with cathode foil 12. Here, since a sufficient amount of the conductive polymer is also attached to separator 13 interposed between the dielectric layer and cathode foil 12, a conductive path of the conductive polymer is formed between the dielectric layer and cathode foil 12. That is, the conductive polymer forms a strong conductive path electrically connecting the dielectric layer and cathode foil 12 using separator 13.

Further, the liquid component is impregnated into voids of porous sintered body 11 included in capacitor element 10. Here, by controlling (a) the ratio of the mass of the liquid component to the mass of the conductive polymer housed in the case, (b) the ratio of the volume of the liquid component impregnated into porous sintered body 11 to the volume of voids of porous sintered body 11, (c) the dry mass of the conductive polymer included into porous sintered body 11 per unit volume of voids of porous sintered body 11, and the like, it is possible to impregnate a deep portion (particularly near the center) of the porous sintered body with the liquid component.

Anode wire 11W is made of a conductive material. The material of anode wire 11W is not particularly limited, and examples thereof include tantalum (Ta), niobium (Nb), titanium (Ti), tungsten (W), aluminum, and an aluminum alloy. The types of materials that respectively constitute porous sintered body 11 and anode wire 11W may be the same or different from each other. A cross-sectional shape of anode wire 11W is not particularly limited, and examples thereof include a circular shape, a flattened circular shape (a shape formed of straight lines parallel to each other and two curves that connect ends of these straight lines. Hereinafter this shape is referred to as a track shape), an ellipse, a rectangular shape, and a polygon. A diameter of anode wire 11W (a major axis for the track shape and the ellipse) is also not particularly limited and ranges, for example, from 0.1 mm to 1.0 mm, inclusive.

Porous sintered body 11 is produced, for example, by pressure-molding powder of corrosion-resistant metal particles into a cylindrical shape so that one end side of anode wire 11W will be embedded and then sintering the powder.

<<Method for Manufacturing Electrolytic Capacitor>>

Hereinafter, an example of the method of manufacturing the electrolytic capacitor according to the present exemplary embodiment will be described for each step.

(i) Step of Producing Porous Sintered Body

Corrosion-resistant metal particles and anode wire 11W are placed in a mold having a columnar cavity such that one end side of anode wire 11W is embedded in the corrosion-resistant metal particles, and the particles are pressure-molded and then sintered in vacuum, thereby producing a porous sintered body having a columnar shape in which anode terminal 11T protrudes from one end surface. The corrosion-resistant metal particles may be mixed with a binder such as camphor and polyacrylic carbonate, as necessary.

(ii) Step of Forming Dielectric Layer

A dielectric layer is formed on a surface of porous sintered body 11. Specifically, porous sintered body 11 is immersed in an electrolytic aqueous solution (e.g., phosphoric acid aqueous solution) filling an anodizing tank, anode terminal 11T is connected to the external electrode, and anodization is performed, so that a film (dielectric layer) of an oxide of the corrosion-resistant metal can be formed on a surface of porous sintered body 11. The electrolytic aqueous solution is not limited to the phosphoric acid aqueous solution, and nitric acid, acetic acid, sulfuric acid, or the like can be used.

(iii) Step of Forming Solid Electrolyte Layer

Next, the conductive polymer is attached to the surface of the dielectric layer to form a solid electrolyte layer containing the conductive polymer. The conductive polymer may be formed in situ by chemical polymerization or electrolytic polymerization using a polymerization liquid and attached to the dielectric layer. The polymerization liquid is a solution containing a monomer or an oligomer, a dopant (such as the first sulfonic acid), and the like. In the case of chemical polymerization, an oxidant is added to the polymerization liquid. Alternatively, a conductive polymer synthesized in advance may be attached to the dielectric layer to form the solid electrolyte layer.

Pyrrole, aniline, thiophene, or a derivative of pyrrole, aniline, or thiophene is used for the monomer or the oligomer. As the dopant, for example, the first sulfonic acid is used. The first sulfonic acid is preferably, but not limited to, the polymeric sulfonic acid described above from the viewpoint of easily suppressing the dedoping phenomenon.

It is preferred to use a polymer dispersion as the conductive polymer synthesized in advance. The polymer dispersion contains a liquid dispersion medium, a conductive polymer dispersed in the dispersion medium, and usually a dopant. A method for applying the polymer dispersion to the surface of the dielectric layer is preferably, for example, a method for impregnating porous sintered body 11 including the dielectric layer with the polymer dispersion and drying the product, because the method is simple. The polymer dispersion preferably contains the conductive polymer as well as the first sulfonic acid as the dopant. For example, a polymer dispersion (PEDOT/PSS) containing PEDOT as the conductive polymer and PSS as the first sulfonic acid is preferable.

The step of applying the polymer dispersion to the surface of the dielectric layer and the drying step may be repeated twice or more. By conducting these steps a plurality of times, a coverage of the conductive polymer on the dielectric layer can be increased.

(iv) Step of Assembling Capacitor Element

Separator 13 is wound one or more turns around the peripheral surface of porous sintered body 11 in which the conductive polymer is attached to the surface of the dielectric layer (solid electrolyte layer is formed), and then cathode foil 12 is wound around the peripheral surface of porous sintered body 11 with separator 13 interposed therebetween. Thereby, capacitor element 10 can be obtained.

(v) Step of Forming Conductive Path

The conductive polymer is applied again to capacitor element 10 including cathode foil 12 and separator 13. Consequently, a part of a space between cathode foil 12 and the dielectric layer is filled with the conductive polymer. When separator 13 is used, the conductive polymer easily adheres to separator 13, so that filling of the conductive polymer between cathode foil 12 and the dielectric layer is facilitated. A polymer dispersion is preferably used also at this time. The step of applying the polymer dispersion to capacitor element 10 and the drying step may be repeated twice or more. By performing these steps a plurality of times, a stronger conductive path can be formed.

(vi) Step of Impregnating Liquid Component

First, anode terminal 11T of the capacitor element in which the conductive path has been formed is inserted into a through hole provided in sealing member 30, and cathode lead 12L is connected to a predetermined cathode terminal or case. Thereafter, the capacitor element is impregnated with a liquid component containing, for example, the second sulfonic acid.

(vii) Step of Assembling Electrolytic Capacitor

The capacitor element impregnated with the liquid component is housed in a metal case having an opening, and an end portion near the opening of the case is caulked to sealing member 30, whereby a cylindrical electrolytic capacitor is completed. Thereafter, an aging treatment may be performed while a rated voltage is being applied.

EXAMPLES

Hereinafter, the present disclosure will be described in more detail based on examples, but the present disclosure is not limited to the examples.

Example 1

An electrolytic capacitor having a rated voltage of 35 V and a rated capacitance of 47 μF was produced in the following manner.

(i) Step of Producing Porous Sintered Body

Tantalum metal particles whose primary particles had an average particle diameter D50 of about 0.1 μm and whose secondary particles had an average particle diameter of about 0.2 μm were used as a valve metal. By using the tantalum metal particles and an anode wire made of tantalum, a porous sintered body in which a part of the anode wire was embedded was formed according to the aforementioned method.

(ii) Step of Forming Dielectric Layer

An anode body was immersed in a phosphoric acid aqueous solution, which is an electrolytic aqueous solution, filling an anodizing tank, and an anode terminal (exposed portion of the anode wire) was connected to an external electrode. Then, anodization was performed to form a uniform dielectric layer of tantalum oxide ($Ta_2O_5$) on a surface of the porous sintered body. The anodization was performed by using phosphoric acid aqueous solution of a 0.02% by mass at a formation voltage of 63 V.

(iii) Step of Forming Solid Electrolyte Layer

A mixed solution was prepared by dissolving, in ion-exchanged water, 3,4-ethylenedioxythiophene and polystyrenesulfonic acid (PSS, weight average molecular weight 100,000) as a polymeric sulfonic acid (first sulfonic acid). While the mixed solution was stirred, iron (III) sulfate (oxidant) was added to the mixed solution to cause a polymerization reaction. After that, the reaction solution was dialyzed to remove the unreacted monomer and the oxidant, so that a polymer dispersion containing polyethylenedioxythiophene doped with about 5% by mass of PSS (PEDOT/PSS) was obtained.

The porous sintered body was immersed in the polymer dispersion for 5 minutes in a reduced pressure atmosphere (40 kPa), and then the porous sintered body was pulled out from the polymer dispersion. Next, the porous sintered body that had been impregnated with the polymer dispersion was dried in a drying furnace at 150° C. for 20 minutes to form a solid electrolyte layer covering at least a part of the dielectric layer.

(iv) Step of Assembling Capacitor Element

Carbon paste (a mixture containing colloidal graphite and water as main components) was applied to the inner surface of an aluminum foil having a thickness of 30 μm to form a carbon layer, thereby forming a cathode foil having a carbon layer.

A separator was wound one turn around the peripheral surface of the porous sintered body in which the solid electrolyte layer was formed on the surface of the dielectric layer, and then the cathode foil having the carbon layer was wound one turn around the peripheral surface of the porous sintered body with the separator interposed therebetween to provide a capacitor element.

(v) Step of Forming Conductive Path

The capacitor element including the cathode foil and the separator was immersed again in the same polymer dispersion as in the above (iii) for five minutes, and then the capacitor element was pulled up from the polymer dispersion. Next, the capacitor element was dried in a drying furnace at 150° C. for 20 minutes, and a part of a space between the cathode foil and the dielectric layer was filled with the conductive polymer.

(vi) Step of Impregnating Liquid Component

The anode terminal of the capacitor element in which the conductive path had been formed was inserted into a through hole provided in a predetermined sealing member, and a cathode lead was connected to a case. Thereafter, the following liquid component was injected into the case, and the capacitor element was immersed in the liquid component in a reduced pressure atmosphere (40 kPa) for 5 minutes.

The liquid component was prepared by dissolving 5-sulfosalicylic acid (dibasic acid component) as the second sulfonic acid and triethylamine as the base component in ethylene glycol (EG) as the solvent at a concentration of 25% by mass in total. An equivalence ratio of 5-sulfosalicylic acid to triethylamine was 2.0.

(vii) Step of Assembling Electrolytic Capacitor

The capacitor element impregnated with the liquid component was housed in an aluminum case having an opening, and an end portion near the opening of the case was closed with a butyl rubber sealing member, whereby cylindrical electrolytic capacitor (A1) was completed. Then, aging was performed at 95° C. for 90 minutes while a voltage of 44 V was applied.

Evaluation

The capacitance, ESR (X0), and leakage current (LC) (Y0) at 35 V after aging were measured for capacitor A1. In addition, in order to evaluate long-term reliability, an increasing ratio of ESR (ΔESR) and an increasing ratio of LC (ΔLC) were evaluated by measuring ESR (X), and LC (Y) at 35 V after holding the capacitor at 145° C. for 2,000 hours while the rated voltage was being applied. ΔESR was shown by the percentage (X/X0×100%) of ESR (X) after being held at 145° C. to the initial value (X0). ΔLC was shown by the percentage (Y/Y0×100%) of LC (Y) after being held at 145° C. to the initial value (Y0). The results are shown in Table 1.

Comparative Example 1

Electrolytic capacitor B1 was produced in the same manner as in Example 1 except that the step of forming a conductive path was not performed. Electrolytic capacitor B1 was evaluated in the same manner.

Comparative Example 2

Electrolytic capacitor B2 was produced in the same manner as in Example 1 except that an exterior body was formed with an epoxy resin without using an aluminum case having an opening and a butyl rubber sealing member in the step of assembling an electrolytic capacitor. Electrolytic capacitor B2 was evaluated in the same manner.

Comparative Example 3

Electrolytic capacitor B3 was produced in the same manner as in Comparative Example 1 except that the step of impregnating a liquid component was not performed. Electrolytic capacitor B3 was evaluated in the same manner.

TABLE 1

| Electrolytic capacitor | Capacitance (μF) | ESR(X0) (mΩ) | LC(Y0) (μA) | ΔESR | ΔLC |
|---|---|---|---|---|---|
| A1 | 47.3 | 45 | 3.4 | 115 | 330 |
| B1 | 47.4 | 1050 | 2.8 | 138 | 270 |
| B2 | 47.2 | 46 | 5.8 | 1320 | 1050 |
| B3 | 47.1 | 40 | 48.4 | 3880 | 135 |

As shown in Table 1, in electrolytic capacitor A1 of Example 1, initial ESR is small, initial LC is small, and ΔESR and ΔLC after retention at 145° C. are also kept small. On the other hand, in electrolytic capacitor B1 of Comparative Example 1, initial ESR is large. Further, in electrolytic capacitor B2 of Comparative Example 2, since the liquid component permeates and decreases through the exterior body formed of the resin component, ΔESR increases because deterioration of the solid electrolyte layer cannot be suppressed, and ΔLC increases because the dielectric layer cannot be sufficiently repaired. Further, since electrolytic capacitor B3 of Comparative Example 3 does not contain a liquid component, initial LC is large, and ΔESR remarkably increases because the degradation of the solid electrolyte layer cannot be suppressed.

The present disclosure can be applied to what is called a hybrid electrolytic capacitor that includes a conductive polymer and a liquid component (or an electrolytic solution).

What is claimed is:

1. An electrolytic capacitor comprising:
  a capacitor element;
  a liquid component;
  a case housing the capacitor element and the liquid component; and
  a sealing member sealing the case, wherein:
  the capacitor element includes:
    a porous sintered body including a dielectric layer, the porous sintered body having a top surface, a bottom surface and an outer peripheral surface between the top surface and the bottom surface;
    a cathode foil facing the outer peripheral surface of the porous sintered body;
    a separator disposed between the cathode foil and the porous sintered body, the separator covering the outer peripheral surface of the porous sintered body; and
    a conductive polymer disposed in an inside of the porous sintered body and in the separator, the conductive polymer covering at least a part of a surface of the dielectric layer,
  the conductive polymer forms, in the separator, a conductive path electrically connecting the cathode foil and the dielectric layer disposed in the inside of the porous sintered body, and
  the capacitor element is impregnated with the liquid component.

2. The electrolytic capacitor according to claim 1, wherein the dielectric layer contains an oxide of at least one metal selected from the group consisting of tantalum, niobium, titanium, aluminum, silicon, and tungsten.

3. The electrolytic capacitor according to claim 1, wherein the cathode foil is a foil including a valve metal as a main component.

4. The electrolytic capacitor according to claim 1, wherein the cathode foil further includes a conductive layer including at least one selected from the group consisting of titanium, nickel, and carbon, the conductive layer being disposed on a surface of the cathode foil.

5. The electrolytic capacitor according to claim 1, wherein the liquid component contains an alkylene glycol compound.

6. The electrolytic capacitor according to claim 1, wherein:
  the conductive polymer contains a π-conjugated conductive polymer and a first sulfonic acid, and
  the liquid component contains a second sulfonic acid.

7. The electrolytic capacitor according to claim 1, wherein:
  the capacitor element includes an anode terminal electrically connected to the porous sintered body, the anode terminal being constituted by an anode wire planted from the top surface of the porous sintered body, and
  the anode terminal penetrates the sealing member to be drawn out of the case.

8. The electrolytic capacitor according to claim 1, wherein:
  the porous sintered body has a cylindrical shape having the top surface, the bottom surface, and the outer peripheral surface.

9. The electrolytic capacitor according to claim 1, wherein:
  the capacitor element further includes a cathode terminal electrically connected to the cathode foil, and
  the cathode terminal penetrates the sealing member and is drawn out of the case.

10. The electrolytic capacitor according to claim 1, wherein the sealing member includes an insulating member having rubber elasticity.

11. The electrolytic capacitor according to claim 1, wherein the case is a metal container.

12. The electrolytic capacitor according to claim 1, wherein the separator covers a part of the top surface and a part of the bottom surface.

13. The electrolytic capacitor according to claim 1, wherein a part of a space between the cathode foil and the dielectric layer is filled with the conductive polymer.

14. The electrolytic capacitor according to claim 1, wherein the separator covers an entirety of the outer peripheral surface of the porous sintered body.

* * * * *